US011132230B2

(12) United States Patent
Punadikar et al.

(10) Patent No.: US 11,132,230 B2
(45) Date of Patent: Sep. 28, 2021

(54) MANAGING QUALITY OF SERVICE IN A NETWORK FILE SHARE ENVIRONMENT

(71) Applicant: International Business Machines Corporation, Armonk, NY (US)

(72) Inventors: Sachin Chandrakant Punadikar, Pune (IN); Sasikanth Eda, Vijayawada (IN); Abhishek Jain, Baraut (IN); Sandeep Ramesh Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 16/512,161

(22) Filed: Jul. 15, 2019

(65) Prior Publication Data

US 2021/0019190 A1     Jan. 21, 2021

(51) Int. Cl.
    *G06F 9/50*         (2006.01)
    *G06F 9/48*         (2006.01)
    *G06F 9/54*         (2006.01)
    *G06F 16/182*     (2019.01)

(52) U.S. Cl.
CPC .......... *G06F 9/5016* (2013.01); *G06F 9/4881* (2013.01); *G06F 9/547* (2013.01); *G06F 16/183* (2019.01)

(58) Field of Classification Search
CPC ...... G06F 9/5016; G06F 9/4881; G06F 9/547; G06F 16/183
See application file for complete search history.

(56) References Cited

U.S. PATENT DOCUMENTS

| | | | |
|---|---|---|---|
| 9,003,157 B1 * | 4/2015 | Marshak | G06F 3/061 |
| | | | 711/173 |
| 10,013,170 B1 * | 7/2018 | Sahin | G06F 3/0638 |
| 2015/0256432 A1 | 9/2015 | Agarwala et al. | |
| 2015/0301913 A1 * | 10/2015 | Gomi | G06F 11/2038 |
| | | | 714/6.2 |
| 2016/0042194 A1 * | 2/2016 | Chakraborty | G06F 3/0622 |
| | | | 726/17 |
| 2017/0262223 A1 | 9/2017 | Dalmatov et al. | |
| 2018/0101324 A1 | 4/2018 | Sharma | |
| 2020/0026438 A1 * | 1/2020 | Peleg | G06F 12/10 |

OTHER PUBLICATIONS

Zhu et al., "PriorityMeister: Tail Latency QoS for Shared Networked Storage," ACM, Symposium on Cloud Computing (SOCC '14), Nov. 3-5, 2014, 14 pages.
Deniel et al., "Ganesha, a multi-usage with large cache NFSv4 server," Linux Symposium, 2007, pp. 11-26, retrieved from http://nfs-ganesha.sourceforge.net/files/nfs-ganesha-ols2007.pdf.

(Continued)

*Primary Examiner* — Sisley N Kim
(74) *Attorney, Agent, or Firm* — Zilka-Kotab, P.C.

(57) ABSTRACT

A computer-implemented method according to one embodiment includes partitioning resources of a network file system (NFS) platform into a plurality of zones, based on a number of exports within the NFS platform; receiving, at one of the exports within the NFS platform, a request from a first application to utilize the resources of the NFS platform; and allocating a predetermined portion of the resources to the first application within one of the plurality of zones, based on information included within the request.

20 Claims, 9 Drawing Sheets

(56) References Cited

OTHER PUBLICATIONS

CSRC, "Cloud Computing," Computer Security Resource Center, Oct. 2017, 3 pages, retrieved from https://csrc.nist.gov/projects/cloud-computing.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.

\* cited by examiner

MANAGING QUALITY OF SERVICE IN A NETWORK FILE SHARE ENVIRONMENT

BACKGROUND

The present invention relates to network file sharing, and more particularly, this invention relates to implementing quality of service measures within a network file sharing environment.

Network file sharing (NFS) is commonly used to implement a centralized management and availability of data and resources. NFS servers may reside on-premises or within cloud datacenters, where they are provided as a NFS as a service (NFSaaS) feature. However, current NFS implementations do not internally implement quality of service (QoS) functionality. As a result, high priority client applications that necessitate fast I/O performance may be treated the same as lower priority client applications that do not need such performance. This may reduce a performance of such applications, and the system in general.

BRIEF SUMMARY

A computer-implemented method according to one embodiment includes partitioning resources of a network file system (NFS) platform into a plurality of zones, based on a number of exports within the NFS platform; receiving, at one of the exports within the NFS platform, a request from a first application to utilize the resources of the NFS platform; and allocating a predetermined portion of the resources to the first application within one of the plurality of zones, based on information included within the request.

According to another embodiment, a computer program product for managing quality of service in a network file share environment includes a computer readable storage medium having program instructions embodied therewith, where the computer readable storage medium is not a transitory signal per se, and where the program instructions are executable by a processor to cause the processor to perform a method including partitioning, by the processor, resources of a network file system (NFS) platform into a plurality of zones, based on a number of exports within the NFS platform; receiving, by the processor at one of the exports within the NFS platform, a request from a first application to utilize the resources of the NFS platform; and allocating, by the processor, a predetermined portion of the resources to the first application within one of the plurality of zones, based on information included within the request.

According to another embodiment, a system includes a processor; and logic integrated with the processor, executable by the processor, or integrated with and executable by the processor, where the logic is configured to partition resources of a network file system (NFS) platform into a plurality of zones, based on a number of exports within the NFS platform; receive, at one of the exports within the NFS platform, a request from a first application to utilize the resources of the NFS platform; and allocate a predetermined portion of the resources to the first application within one of the plurality of zones, based on information included within the request.

Other aspects and embodiments of the present invention will become apparent from the following detailed description, which, when taken in conjunction with the drawings, illustrate by way of example the principles of the invention.

DETAILED DESCRIPTION

Figure 1:
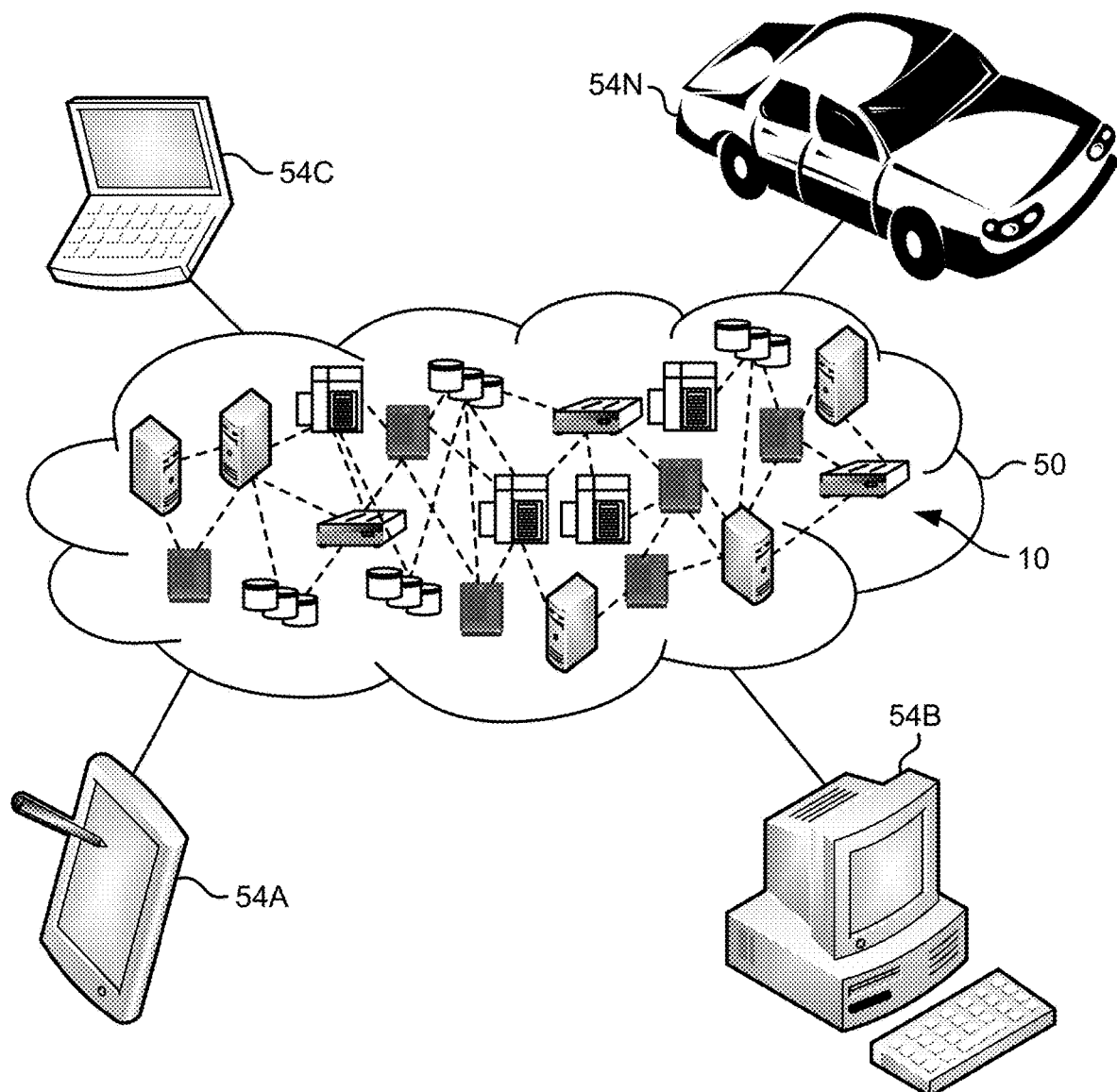
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of managing quality of service in a network file share environment.

In one general embodiment, a computer-implemented method includes partitioning resources of a network file system (NFS) platform into a plurality of zones, based on a number of exports within the NFS platform; receiving, at one of the exports within the NFS platform, a request from a first application to utilize the resources of the NFS platform; and allocating a predetermined portion of the resources to the first application within one of the plurality of zones, based on information included within the request.

In another general embodiment, a computer program product for managing quality of service in a network file share environment includes a computer readable storage medium having program instructions embodied therewith, where the computer readable storage medium is not a transitory signal per se, and where the program instructions are executable by a processor to cause the processor to perform a method including partitioning, by the processor, resources of a network file system (NFS) platform into a plurality of zones, based on a number of exports within the NFS platform; receiving, by the processor at one of the exports within the NFS platform, a request from a first application to utilize the resources of the NFS platform; and allocating, by the processor, a predetermined portion of the resources to the first application within one of the plurality of zones, based on information included within the request.

In another general embodiment, a system includes a processor; and logic integrated with the processor, executable by the processor, or integrated with and executable by the processor, where the logic is configured to partition resources of a network file system (NFS) platform into a plurality of zones, based on a number of exports within the NFS platform; receive, at one of the exports within the NFS platform, a request from a first application to utilize the resources of the NFS platform; and allocate a predetermined portion of the resources to the first application within one of the plurality of zones, based on information included within the request.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
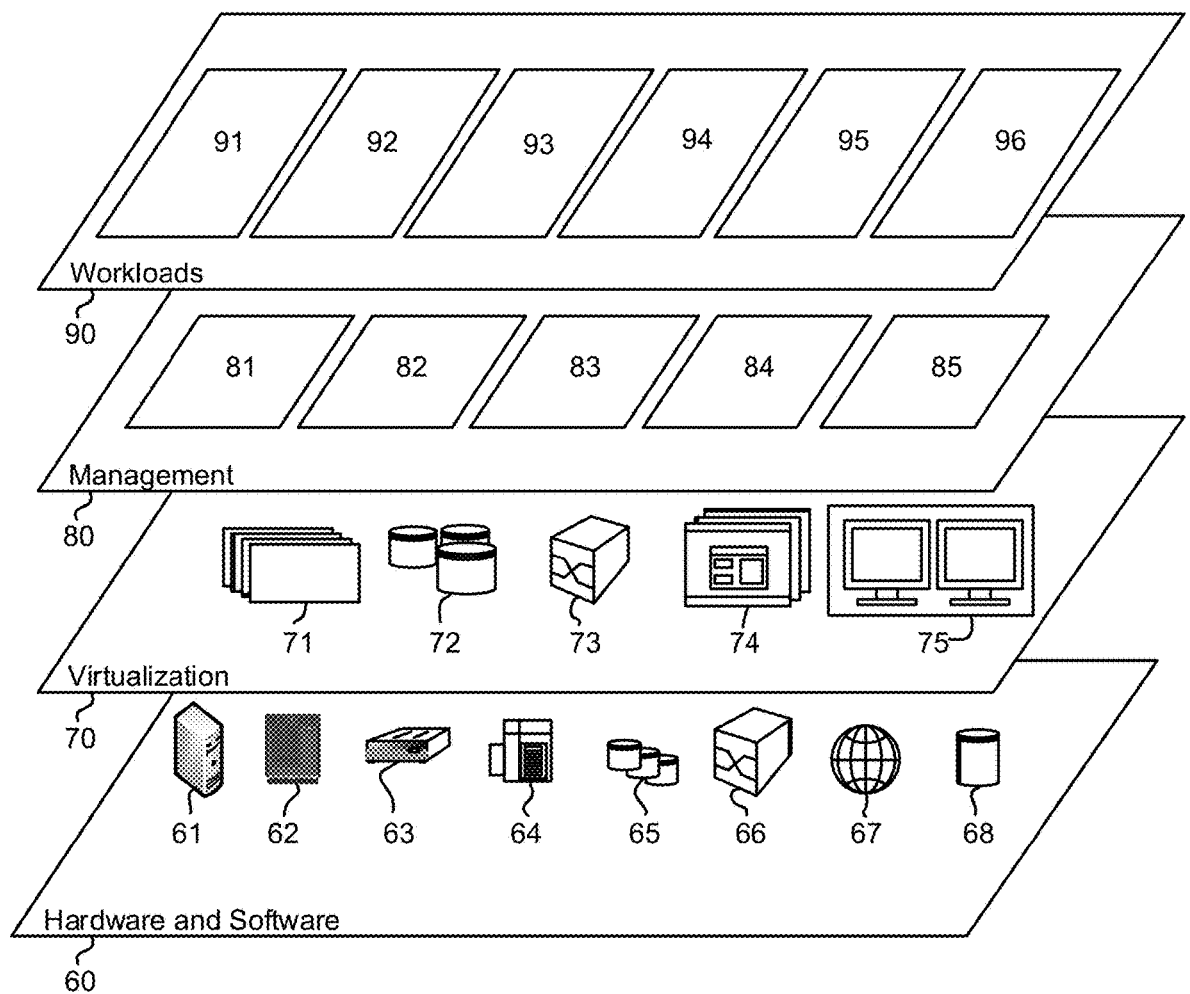
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and NFS/NFSaaS 96.

Figure 3:
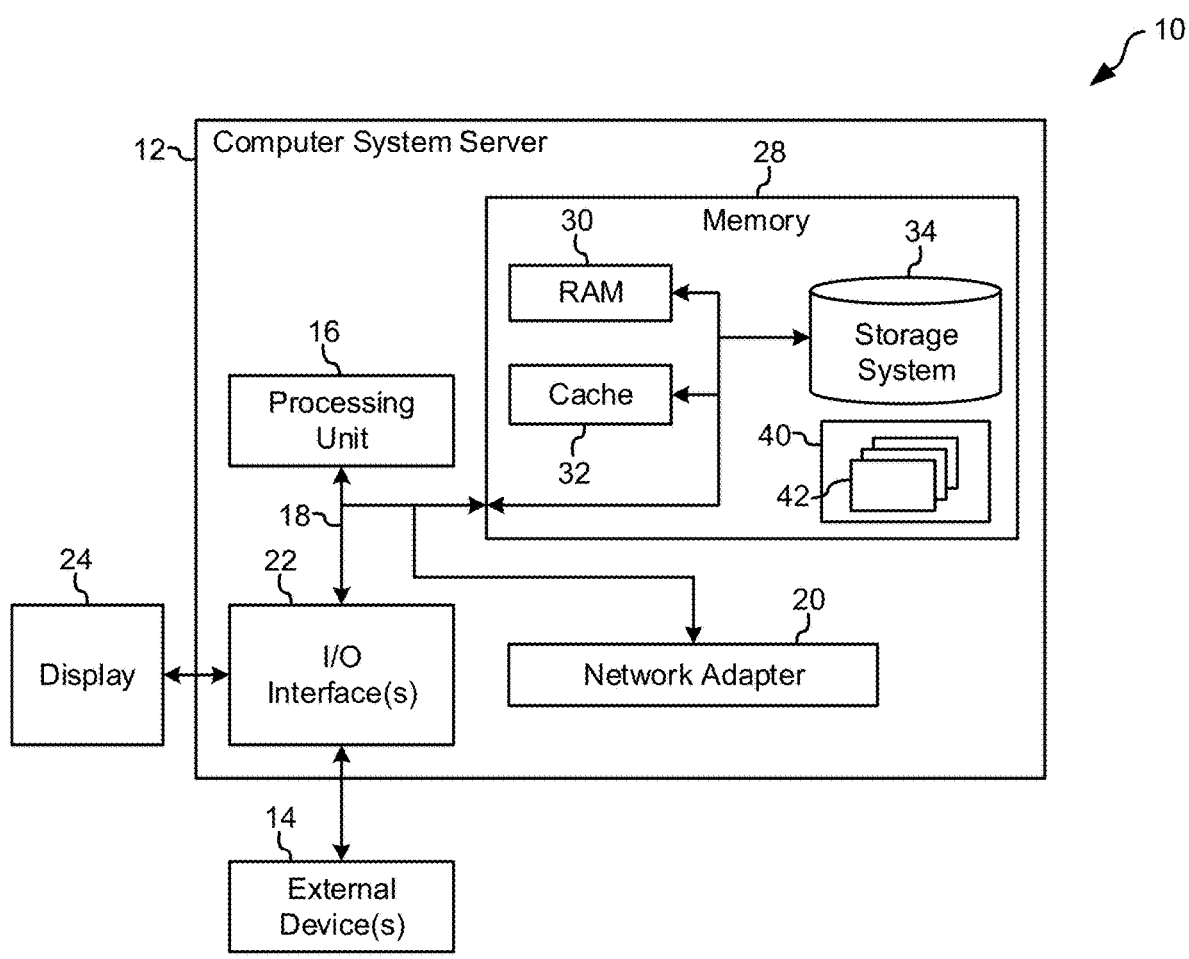
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
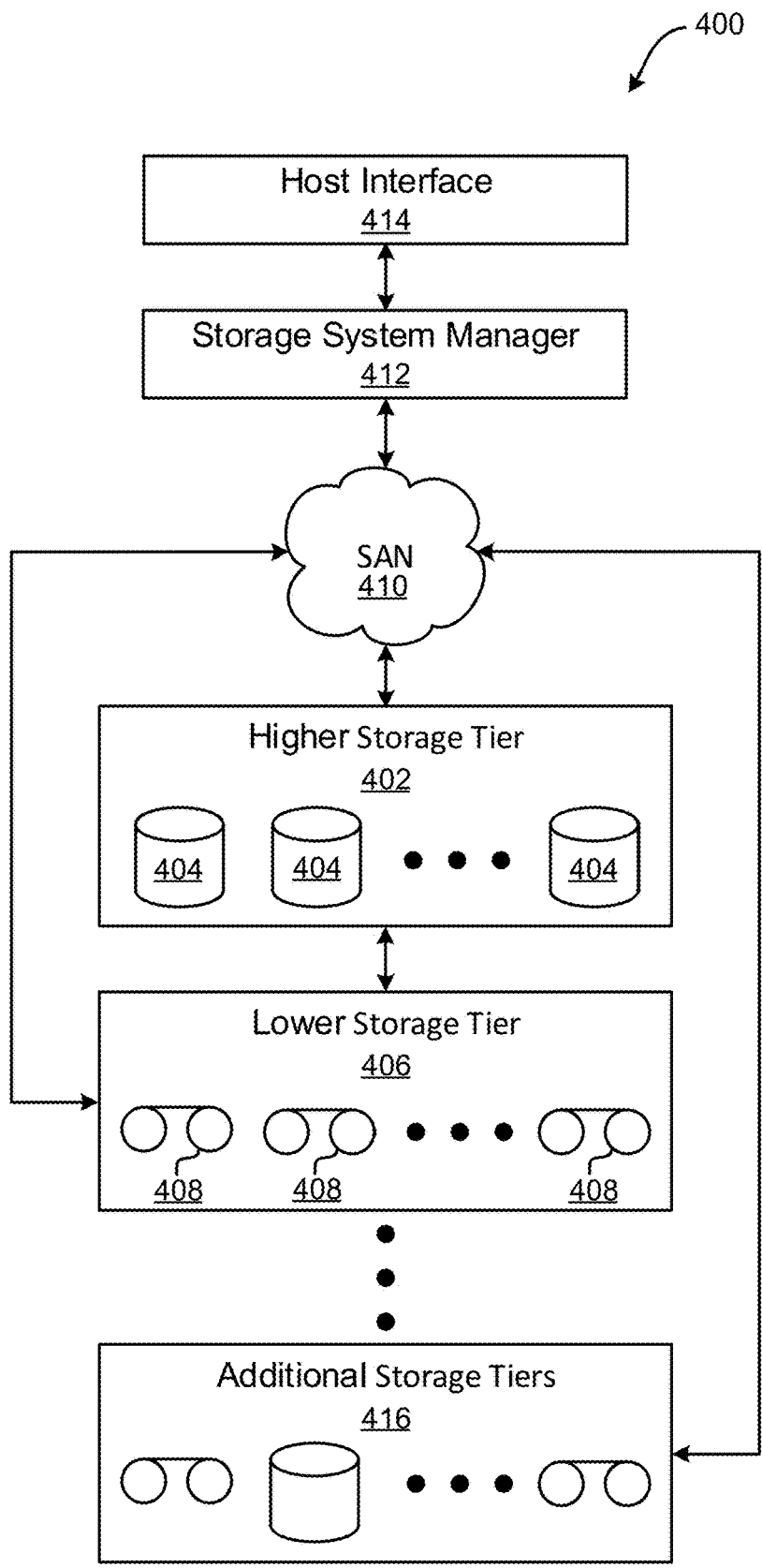
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
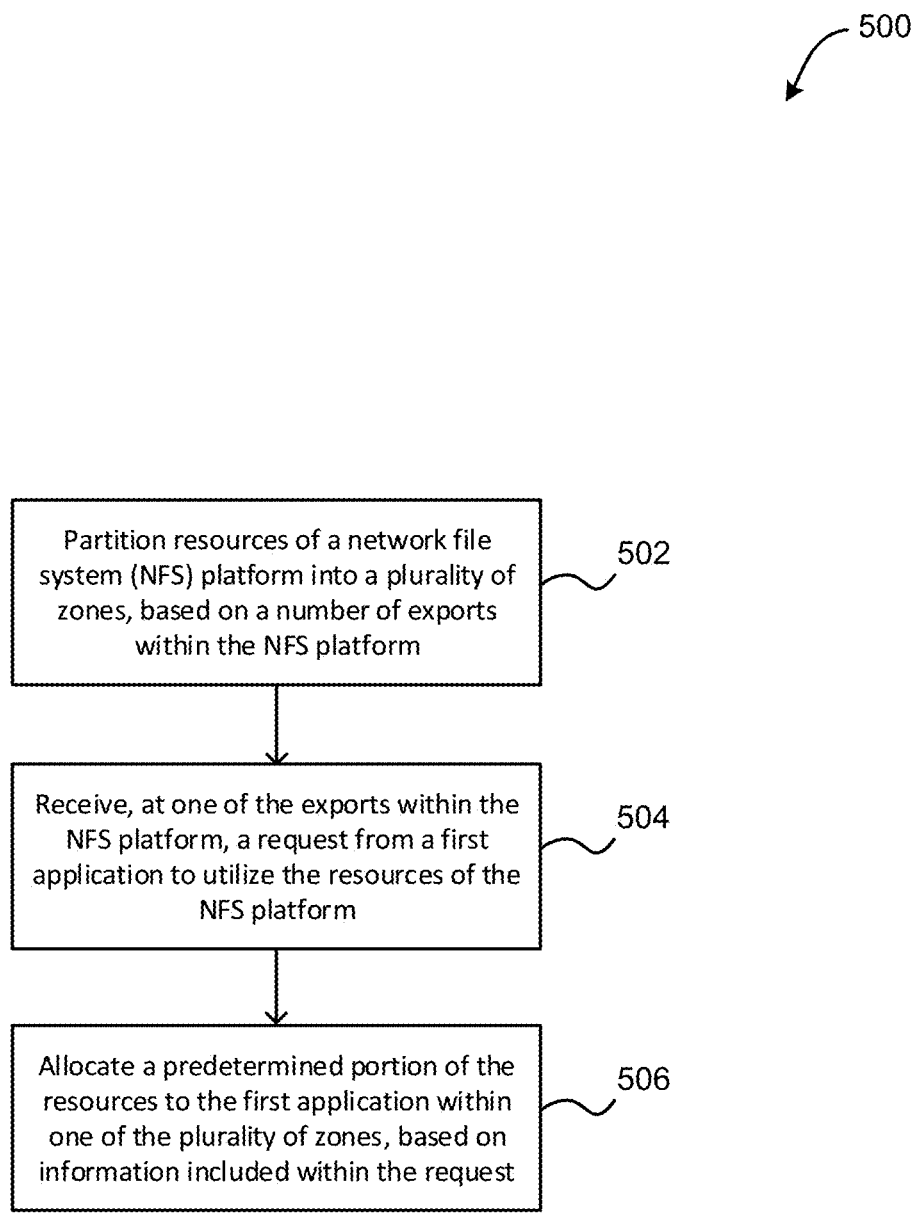
FIG. 5 illustrates a flowchart of a method for managing quality of service in a network file share environment, in accordance with one embodiment of the present invention.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where resources of a network file system (NFS) platform are partitioned into a plurality of zones, based on a number of exports within the NFS platform. In one embodiment, the resources may include storage space available within the NFS platform (e.g., space for storing data that is available within the NFS platform, etc.). In another embodiment, the resources may include processing resources available within the NFS platform (e.g., CPU processor cycles, processor memory, etc.).

Additionally, in one embodiment, the resources may include one or more network buffers available within the NFS platform. In another embodiment, the resources may include a number of remote procedure calls available within the NFS platform. In yet another embodiment, the resources may include one or more data caches available within the NFS platform. In still another embodiment, the resources may include one or more metadata caches available within the NFS platform.

Further, in one embodiment, the resources may include one or more remote procedure calls (RPCs) available within the NFS platform. In another embodiment, the resources may include one or more scheduler priorities available within the NFS platform. In yet another embodiment, the resources may include one or more storage controller priorities available within the NFS platform.

Further still, in one embodiment, the NFS platform may contain a clustered filesystem. For example, the NFS platform may contain a clustered plurality of nodes, where each of the clustered plurality of nodes may include a system that includes a predetermined amount of the resources such as physical storage capacity, processing resources, data caches, etc. In another example, each node may include one or more storage drives (e.g., solid state drives (SSDs), hard disk drives, tape drives, flash memory, etc.) that provides physical storage capacity, one or more hardware processors that provides processing resources, etc.

Also, in one embodiment, the NFS platform may provide a level of abstraction between one or more clients and the physical storage capacity provided by the plurality of nodes. In another embodiment, the NFS platform may provide an abstract filesystem to the nodes, where the filesystem utilizes the physical storage capacity provided by the plurality of nodes.

In addition, in one embodiment, each of the plurality of zones may be assigned to a single export within the NFS platform. In another embodiment, each of the plurality of zones may be assigned a predetermined percentage of the resources of the NFS platform. For example, a first zone may be allocated thirty percent of available storage space within the NFS platform, a second zone may be allocated seventy percent of available storage space within the NFS platform, etc.

Furthermore, in one embodiment, the assignment of resources may be based on a number of clients having access to each of the plurality of exports. For example, a first export accessible by a larger number of clients than a second export may be assigned to a first zone having more NFS platform resources than a second zone assigned to the second export.

Further still, in one embodiment, each export within the NFS platform may include a directory or folder that acts as an interface for accessing the resources of the NFS platform.

In this way, each export of the NFS platform may be associated with a predetermined portion of all resources of the NFS platform. This may effectively distribute all available resources within the NFS platform, thereby enabling consistent resource allocation.

Also, method 500 may proceed with operation 504, where a request to utilize the resources of the NFS platform is received from a first application at one of the exports within the NFS platform. In one embodiment, the request may include a remote procedure call (RPC). In another embodiment, the request may be received from an application running on a client separate from the system. For example, the client may include a computing device such as a mobile device, a desktop computing device, etc.

Additionally, in one embodiment, the request may be associated with one of the plurality of the zones. For example, the request may be associated with the zone assigned to the export that received the request. In another embodiment, the application may include a program running on a client in communication with the NFS platform. For example, the application may request to utilize the resources of the NFS platform during the running of the application.

Further, method 500 may proceed with operation 506, where a predetermined portion of the resources is allocated to the first application within one of the plurality of zones, based on information included within the request. In one embodiment, the information included within the request may include an identifier of the first application (e.g., an application ID, etc.). In another embodiment, the information included within the request may include a priority of the first application. In yet another embodiment, the information included within the request may include a requested storage tier. In another embodiment, the request may be implemented utilizing the requested storage tier, in response to determining that the requested storage tier is available.

Further still, in one embodiment, the predetermined portion of the resources may be allocated only from the zone assigned to the export that received the request. In another embodiment, the information included within the request may be compared to information included within another request for resources received at the same export. For example, the other request for resources may be received at the same export from a second separate application. In another example, the other request for resources may be received from the second application at the same export prior or subsequent to the request received from the first application.

Also, in one embodiment, a first priority may be determined for the first application based on the information included in the request from the first application. In another embodiment, a second priority may be determined for the second application based on the information included in the request from the second application. In yet another embodiment, the first priority may be compared to the second priority.

In addition, in one embodiment, the predetermined portion of the resources allocated to the first application may be greater than a predetermined portion of the resources allocated to the second application when the first priority is greater than the second priority. In another embodiment, the predetermined portion of the resources allocated to the first application may be less than a predetermined portion of the resources allocated to the second application when the first priority is less than the second priority.

In this way, resources of the NFS platform may be dynamically allocated to client applications, based on a priority of the applications. This may ensure that important high-priority applications have priority access to NFS platform resources, which may ensure the performance of such applications. By ensuring that high-priority applications can access NFS platform resources with a greater priority when compared to lower-priority applications, overall system performance may be improved as well.

Methodology for Enabling QoS in an NFSaaS Hosting Platform

In one embodiment, a framework is provided that helps enable quality of service (QoS) in a NFSaaS (Network File Share as a Service) hosting platform by effectively partitioning the user space NFS server resources along with appropriately placing data in respective storage pools based on weights allocated to applications.

Network file systems (NFS) are derived from a distributed file system mechanism. They are implemented in computing environments where the centralized management of data and resources is critical. Network file systems work on all IP-based networks. They use TCP and UDP for data access and delivery, depending on the version in use.

Traditionally, NFS is implemented as an on-premise client/server computing model, where an NFS server (e.g., a single physical machine or a cluster of multiple machines) manages the authentication, authorization and management of clients (could be different machines other than NFS servers on which applications are installed), as well as all the data shared within a specific file system. Once authorized, clients can view and access the data through their local systems in a similar manner as an internal disk drive.

Recently it has been observed that cloud vendors are providing NFS as a service (NFSaaS), where NFS servers are hosted in datacenters managed by the cloud providers and NFS clients can reside on either cloud datacenters or on-premises.

A user space NFS server may provide advantages over a kernel NFS. For example, working in user space makes it possible to allocate very large piece of memory, and accessing services such as security and authentication in user space is easy.

Currently, no NFS versions are built to have quality of service (QoS). Such NFS systems are therefore unable to fully provide control of QoS from an NFS server perspective, which is critical during an implementation of an NFSaaS platform.

In one embodiment, a framework may be provisioned that helps in providing a QoS infrastructure in an NFSaaS hosting platform by effectively partitioning the user space NFS server resources (such as cache, RPC dispatcher, compute, storage, network, RPC's, scheduler priorities, etc.) along with appropriately placing data in respective storage pools based on the weights allocated to applications leveraging the service.

This framework provides the following features and flexibility to a traditional NFSaaS hosting platform:

- The framework enables the collection of an application ID during an NFS RPC handshake. The NFS client passes this application ID to the NFSaaS platform.
- The framework enables the collection of application priority/weight values in the NFS RPC handshake. The application priorities are determined by the cloud users.
- The framework enables the collection of a preferred storage tier required for an application in an NFS RPC handshake call.
- The framework enables the partitioning of resources at an NFSaaS per export level (by mapping the resources associated per export level to zones). For instance, the NFSaaS hosting platform which is a distributed filesystem may manage a cluster of node partitions created per export level.
- Based on the received application ID and priority, the NFSaaS hosting platform may partition the user space NFS server/zone resources such as cache (data and metadata), RPCs (number of RPC's from a client per application to be processed/responded within a compound request), compute resources (CPU and memory), storage resources (block level, storage controller resources) and scheduler priority. A high priority application gets a relatively high share of resources when compared to other non-priority applications. If a new application is launched using a zone which is already in use by other applications, the proposed algorithm triggers a resource rebalance operation which involves adjusting resources allocated to other applications and performing a new partitioning based on the new weights.
- Based on the received preferred storage tier, the NFS server interacts with filesystem pool capabilities such as disk types associated with the target export, and based on a match of a requested disk tier, the NFS server writes data of the specific application to the respective storage tier.

Table 1 illustrates an exemplary RPC message structure including new fields for passing additional request information, according to one exemplary embodiment.

TABLE 1

```
struct call_body {
    unsigned int rpcvers;
    unsigned int prog;
    unsigned int vers;
    unsigned int app_id; /* this id will be used to categorize the application) */
    unsigned int app_priority; /* this id will be used to indicate the priority per application) */
    const *char app_storage_tier; /* this id will be used to indicate preferred storage tier per application) */
    unsigned int proc;
    opaque_auth cred;
    opaque_auth verf;
    /* procedure specific parameters start here */
};
```

Table 2 illustrates exemplary NFS server resources that are partitioned and allocated, according to one exemplary embodiment.

TABLE 2

| RESOURCE | DEFINITION |
| --- | --- |
| Compute (CPU) | Amount/number of CPU cores the NFS threads can utilize |
| Compute (memory) | Amount of memory the NFS threads can utilize |
| Network buffers | Amount/number of network buffers (user and kernel) the NFS threads can utilize |
| Storage controller resources | Amount of storage controller resources that can be utilized per export if the underlying storage is derived from a SAN unit |
| Number of RPCs | Number of PRCs from a client to be served at a time, and a delay in processing/service RPCs per client per application |
| Data cache | Amount of data cache available to an NFS server |
| Metadata cache | An amount of metadata cache available to an NFS server |
| Scheduler priority | A CPU scheduler priority allocated to a process |

Figure 6:
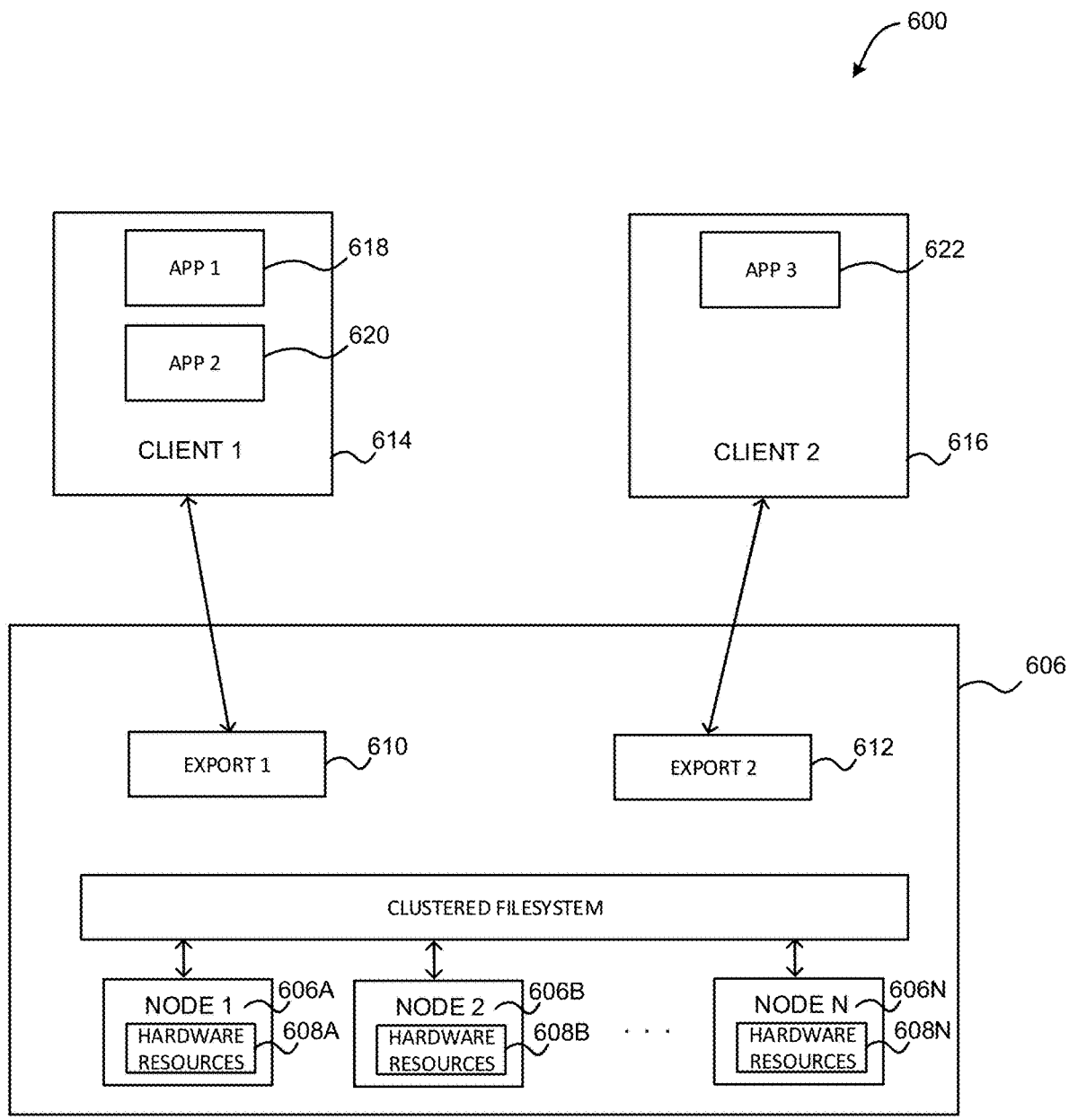
FIG. 6 illustrates an exemplary NFSaaS hosting environment that provides end-to-end quality of service (QoS), in accordance with one embodiment of the present invention.

FIG. 6 illustrates an exemplary NFSaaS hosting environment 600 that provides end-to-end quality of service (QoS), according to one exemplary embodiment. As shown, the hosting environment 600 includes a NFSaaS hosting platform 602. The NFSaaS hosting platform 602 includes a clustered filesystem 604 that manages a plurality of nodes 606A-N.

Additionally, each of these nodes 606A-N includes hardware resources 608A-N that are provided to the clustered filesystem 604. These hardware resources may include one or more storage drives, one or more processors, etc. Further, the NFSaaS hosting platform 602 includes a first export 610 and a second export 612. The first export 610 communicates with a first client 614, and the second export communicates with both the first client 614 and a second client 616. In one embodiment, the exports 610 and 612 may be implemented by the clustered filesystem 604 to expose the resources of the clustered filesystem 604 to the clients 614 and 616 that are accessing such resources. In another embodiment, the first client 614 and the second client 616 may both include NFS clients.

In one embodiment, all resources available within the NFSaaS hosting platform 602 may be grouped together. These resources may include all hardware resources 608A-N, network buffers within the NFSaaS hosting platform 602, storage controller resources within the NFSaaS hosting platform 602, scheduler priorities within the NFSaaS hosting platform 602, remote procedure calls allowed within the NFSaaS hosting platform 602, data and metadata caches within the NFSaaS hosting platform 602, etc.

Further, in one embodiment, this grouping may be divided into a first partition and a second partition. The first partition may be assigned to the first export 610, and the second partition may be assigned to the second export 612. In another embodiment, the second partition may have a larger quantity of resources than the first partition, in response to determining that the second export 612 communicates with more clients than the first export 610.

Further still, in one embodiment, the first export 610 receives a remote procedure call (RPC) from a first application 618 and a second application 620 via the first client 614. Also, the second export 612 receives an RPC from a third application 622 via the second client 616. In one embodiment, the first RPC from the first application 618 may include information indicating an application ID of one, a priority of 100, and a serial ATA (SATA) requested storage tier. Additionally, the second RPC from the second application 620 may include information indicating an application ID of two, a priority of 101, and a serial ATA (SATA) requested storage tier. Further, the third RPC from the third application 622 may include information indicating an application ID of three, a priority of 1, and a solid-state drive (SSD) requested storage tier.

Also, in one embodiment, the NFSaaS hosting platform 602 may compare the information included within the RPC calls, and may allocate portions of the partitions to each application based on the comparison. For example, the NFSaaS hosting platform 602 may note that the third application 622 has a first highest priority, the first application 618 has a second highest priority, and the second application 620 has a third highest priority. Since the third application 622 has the first highest priority and is in communication with only the second export 612 via the second client 616, the majority of the second partition assigned to the second export (e.g., 90%) may be provided by the NFSaaS hosting platform 602 to the third application 622.

Additionally, since the first application 618 has the second highest priority and is in communication with both the first export 610 and the second export 612 via the first client 614, the majority of the first partition assigned to the first export (e.g., 70%) and the remaining portion of the second partition assigned to the second export (e.g., 10%) may be provided by the NFSaaS hosting platform 602 to the first application 618.

Further, since the second application 620 has the third highest priority and is in communication with both the first export 610 and the second export 612 via the first client 614, the remaining portion of the first partition assigned to the first export (e.g., 30%) may be provided by the NFSaaS hosting platform 602 to the second application 620.

Further still, the applications 618-622 may utilize their assigned partition resources during the running of the applications 618-622. For instance, the applications 618-622 may utilize their assigned storage and processing resources to perform one or more operations (e.g., data processing and storage, etc.) during the running of the applications 618-622.

In this way, resources managed by the NFSaaS hosting platform 602 may be dynamically allocated based on a priority derived for the application 618-622 requesting such resources. This may enable an internal QoS implementation by the NFSaaS hosting platform 602.

Figure 7:
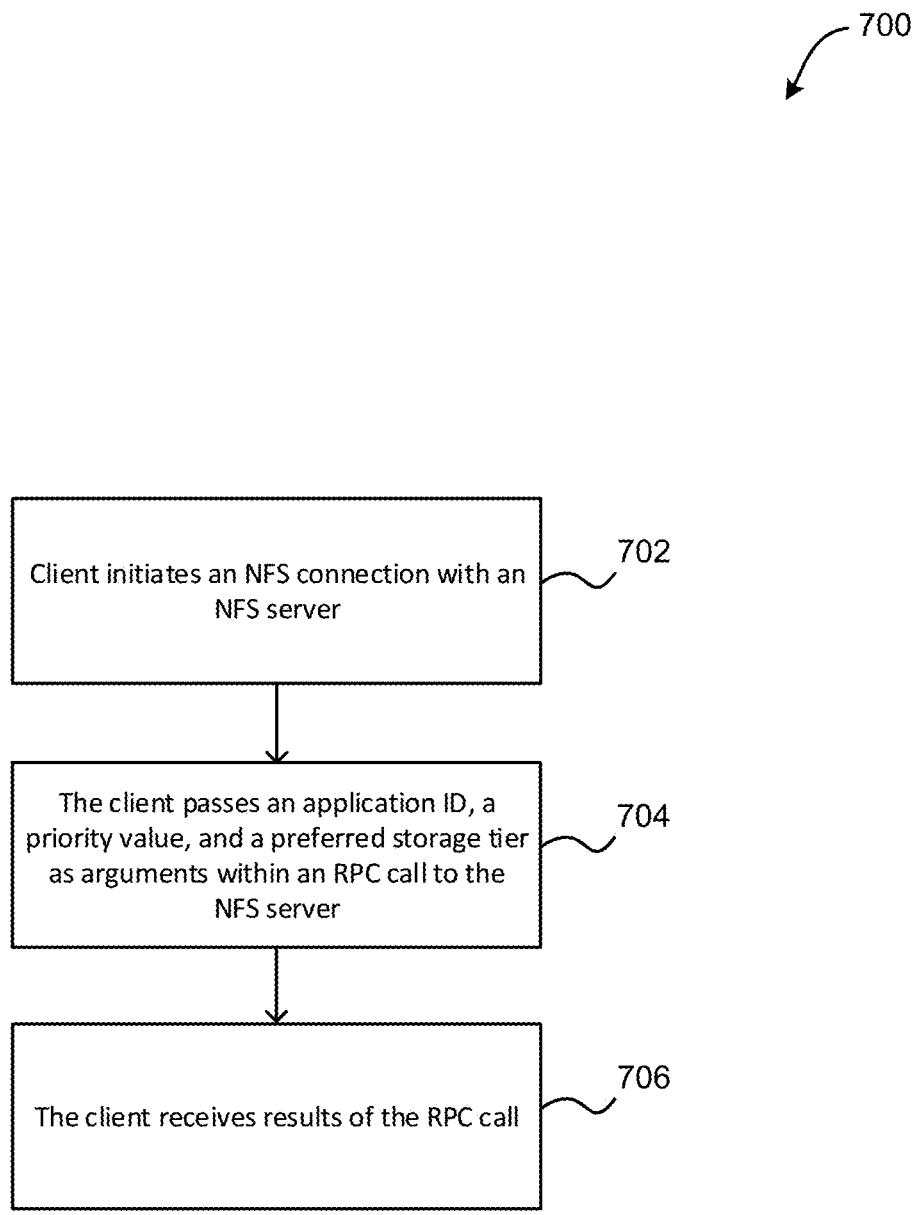
FIG. 7 illustrates a flowchart of a method for implementing QoS on a client, in accordance with one embodiment of the present invention.

Now referring to FIG. 7, a flowchart of a method 700 for implementing QoS on a client is shown according to one embodiment. The method 700 may be performed in accordance with the present invention in any of the environments depicted in FIGS. 1-4 and 6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a client initiates an NFS connection with an NFS server. In one embodiment, the NFS server may include an NFS hosting platform. In another embodiment, the client may initiate the NFS connection with a predetermined export of the NFS server. In yet another embodiment, the client may initiate the NFS connection on behalf of an application running on the client.

Additionally, method 700 may proceed with operation 704, where the client passes an application ID, a priority value, and a preferred storage tier as arguments within an RPC call to the NFS server. In one embodiment, the application ID, priority value, and preferred storage tier may be associated with a predetermined application running on the client.

Further, method 700 may proceed with operation 706, where the client receives results of the RPC call. In one embodiment, the results may include usage of one or more resources of the server, based on the RPC call and the arguments sent to the NFS server via the RPC call.

Figure 8:
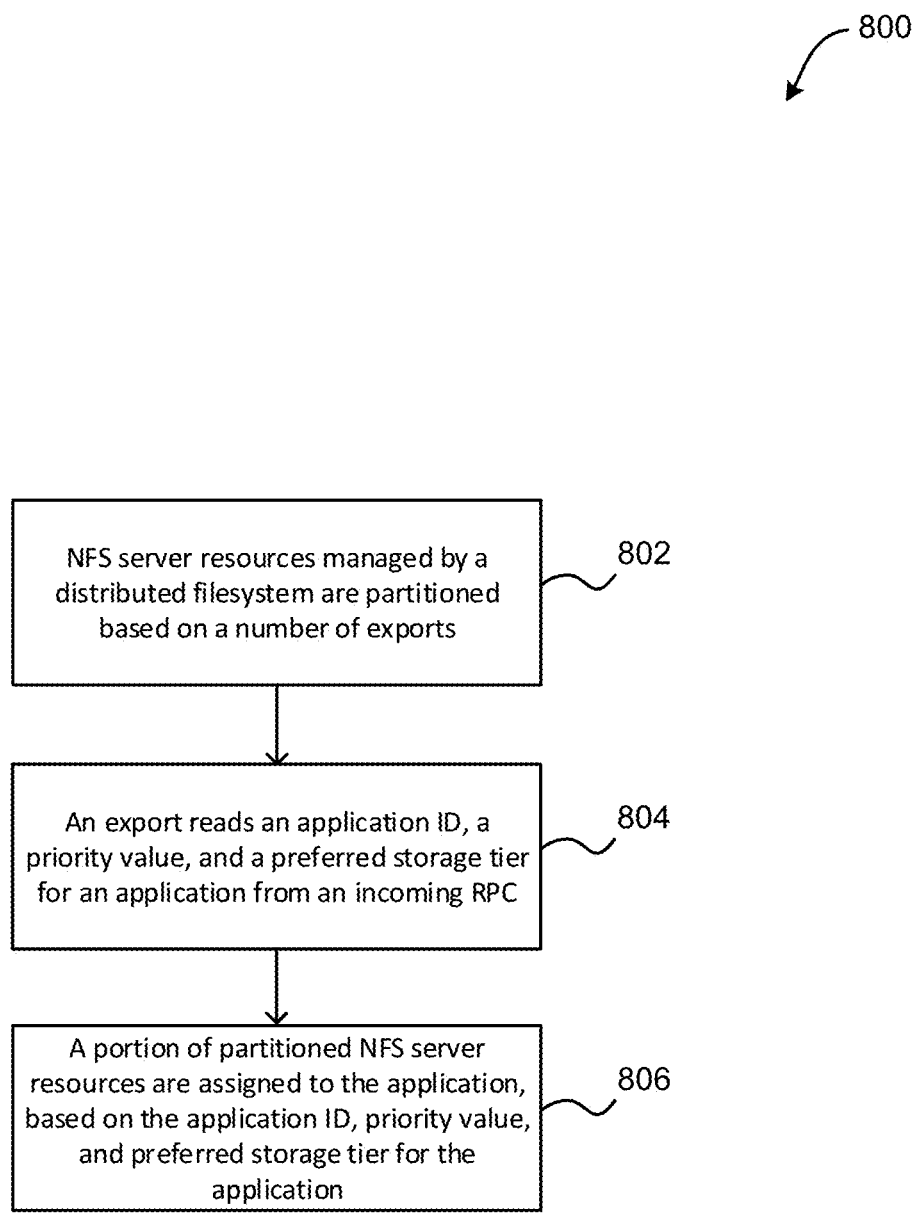
FIG. 8 illustrates a flowchart of a method for partitioning and distributing NFS resources, in accordance with one embodiment of the present invention.

Now referring to FIG. 8, a flowchart of a method 800 for partitioning and distributing NFS resources is shown according to one embodiment. The method 800 may be performed in accordance with the present invention in any of the environments depicted in FIGS. 1-4 and 6, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where NFS server resources managed by a distributed filesystem are partitioned based on a number of exports. Additionally, method 800 may proceed with operation 804, where an export reads an application ID, a priority value, and a preferred storage tier for an application from an incoming RPC.

Further, method 800 may proceed with operation 806, where a portion of partitioned NFS server resources are assigned to the application, based on the application ID, priority value, and preferred storage tier for the application. These NFS server resources may include compute resources (e.g., CPU, memory), network buffers, storage controller resources, scheduler priorities, a number of RPCs, a data cache, a metadata cache, etc.

Figure 9:
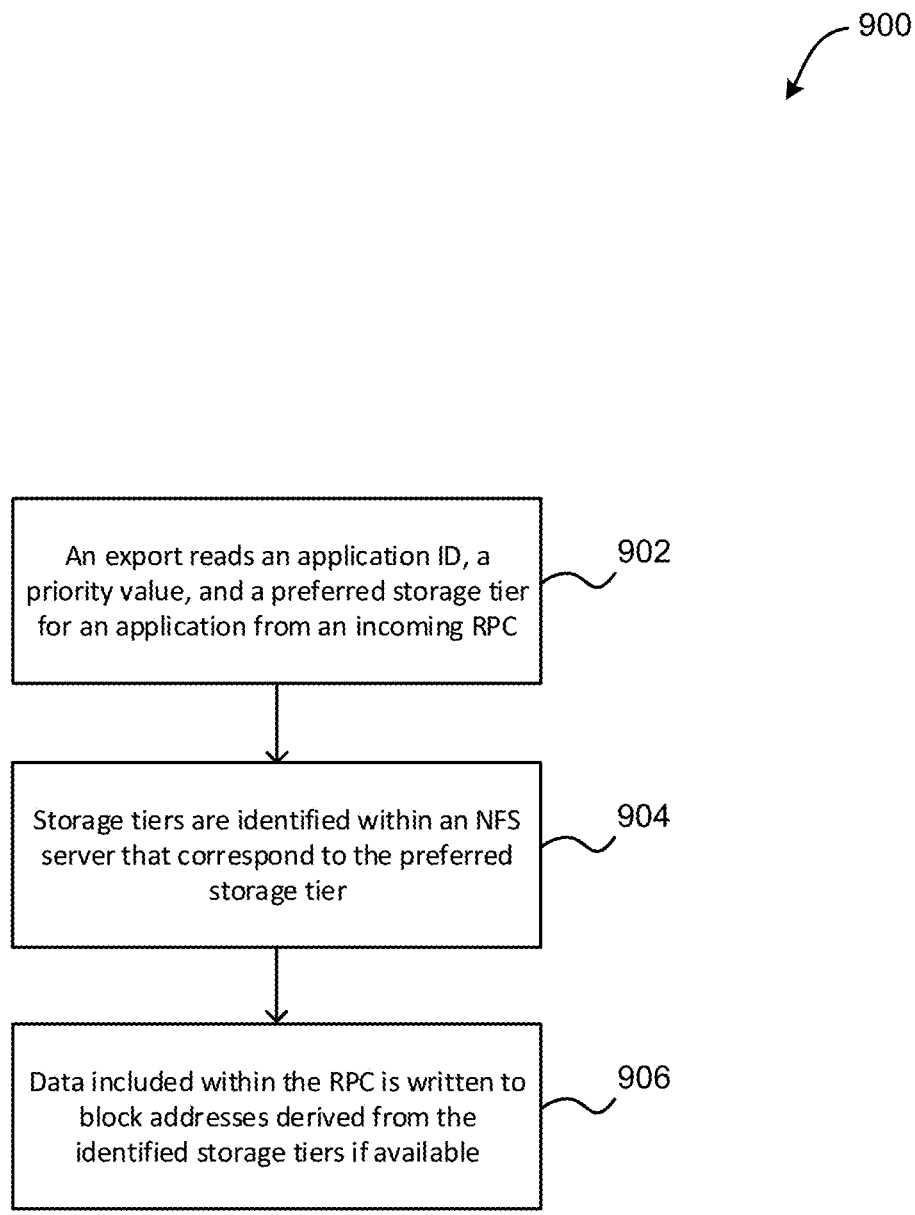
FIG. 9 illustrates a flowchart of a method for implementing storage tier priority of NFS resources, in accordance with one embodiment of the present invention.

Now referring to FIG. 9, a flowchart of a method 900 for implementing storage tier priority of NFS resources is shown according to one embodiment. The method 900 may be performed in accordance with the present invention in any of the environments depicted in FIGS. 1-4 and 6, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where an export reads an application ID, a priority value, and a preferred storage tier for an application from an incoming RPC. Additionally, method 900 may proceed with operation 904, where storage tiers are identified within an NFS server that correspond to the preferred storage tier.

Further, method 900 may proceed with operation 906, where data included within the RPC is written to block addresses derived from the identified storage tiers if available. For example, if storage space is determined to be available in the identified storage tiers, such storage space may be used to fulfill the RPC.

In this way, applications may dictate which storage tiers are used to implement storage of application data within the NFS server.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   partitioning resources of a network file system (NFS) platform into a plurality of zones, based on a number of exports within the NFS platform, where each of the exports includes a directory and/or folder that acts as an interface for accessing the resources of the NFS platform;
   receiving, at one of the exports within the NFS platform, a request from a first application to utilize the resources of the NFS platform; and
   allocating to the first application a portion of a percentage of the resources of the NFS platform included within one of the plurality of zones assigned to the export that received the request, based on information included within the request.

2. The computer-implemented method of claim 1, wherein the resources include storage space available within the NFS platform.

3. The computer-implemented method of claim 1, wherein the resources include processing resources available within the NFS platform.

4. The computer-implemented method of claim 1, wherein each of the plurality of zones is assigned to a single export within the NFS platform, and each of the plurality of zones is assigned a percentage of the resources of the NFS platform.

5. The computer-implemented method of claim 1, wherein the resources of the NFS platform include:
   storage space available within the NFS platform,
   processing resources available within the NFS platform,
   network buffers available within the NFS platform, remote procedure calls available within the NFS platform,
data caches available within the NFS platform,
metadata caches available within the NFS platform,
remote procedure calls (RPCs) available within the NFS platform,
scheduler priorities available within the NFS platform, and
storage controller priorities available within the NFS platform.

6. The computer-implemented method of claim 1, wherein:
the request includes a remote procedure call (RPC), and
the information included within the request includes an identifier of the first application and a requested storage tier.

7. The computer-implemented method of claim 1, wherein the request is received from an application running on a client separate from the NFS platform.

8. The computer-implemented method of claim 1, wherein the information included within the request includes an identifier of the first application.

9. The computer-implemented method of claim 1, wherein the information included within the request includes a priority of the first application.

10. The computer-implemented method of claim 1, wherein the information included within the request includes a requested storage tier.

11. The computer-implemented method of claim 1, wherein the information included within the request includes:
an identifier of the first application,
a priority of the first application, and
a requested storage tier.

12. The computer-implemented method of claim 1, wherein:
a first priority is determined for the first application based on the information included in the request from the first application;
a second priority is determined for a second application based on the information included in a request from the second application;
the first priority is compared to the second priority;
the portion of the resources allocated to the first application are greater than a portion of the resources allocated to the second application in response to determining that the first priority is greater than the second priority; and
the portion of the resources allocated to the first application is less than a portion of the resources allocated to the second application in response to determining that the first priority is less than the second priority.

13. The computer-implemented method of claim 1, wherein the request is implemented utilizing a requested storage tier, in response to determining that the requested storage tier is available.

14. A computer program product comprising one or more computer readable storage media, and program instructions collectively stored on the one or more computer readable storage media, the program instructions comprising instructions configured to cause one or more processors to perform a method comprising:
partitioning, by the one or more processors, resources of a network file system (NFS) platform into a plurality of zones, based on a number of exports within the NFS platform, where each of the exports includes a directory and/or folder that acts as an interface for accessing the resources of the NFS platform;
receiving, by the one or more processors at one of the exports within the NFS platform, a request from a first application to utilize the resources of the NFS platform; and
allocating to the first application, by the one or more processors, a portion of a percentage of the resources of the NFS platform included within one of the plurality of zones assigned to the export that received the request, based on information included within the request.

15. The computer program product of claim 14, wherein the resources include storage space available within the NFS platform.

16. The computer program product of claim 14, wherein the resources include processing resources available within the NFS platform.

17. The computer program product of claim 14, wherein each of the plurality of zones is assigned to a single export within the NFS platform.

18. The computer program product of claim 14, wherein each of the plurality of zones is assigned a percentage of the resources of the NFS platform.

19. The computer program product of claim 14, wherein the request includes a remote procedure call (RPC).

20. A system, comprising:
a processor; and
logic integrated with the processor, executable by the processor, or integrated with and executable by the processor, the logic being configured to:
partition resources of a network file system (NFS) platform into a plurality of zones, based on a number of exports within the NFS platform, where each of the exports includes a directory and/or folder that acts as an interface for accessing the resources of the NFS platform;
receive, at one of the exports within the NFS platform, a request from a first application to utilize the resources of the NFS platform; and
allocate to the first application a portion of a percentage of the resources of the NFS platform included within one of the plurality of zones assigned to the export that received the request, based on information included within the request.

* * * * *